April 15, 1947.  F. J. JOHNS ET AL  2,419,141
MOTOR CONTROL
Filed Aug. 15, 1944  2 Sheets-Sheet 1
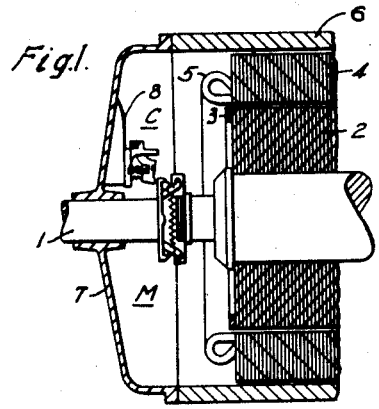
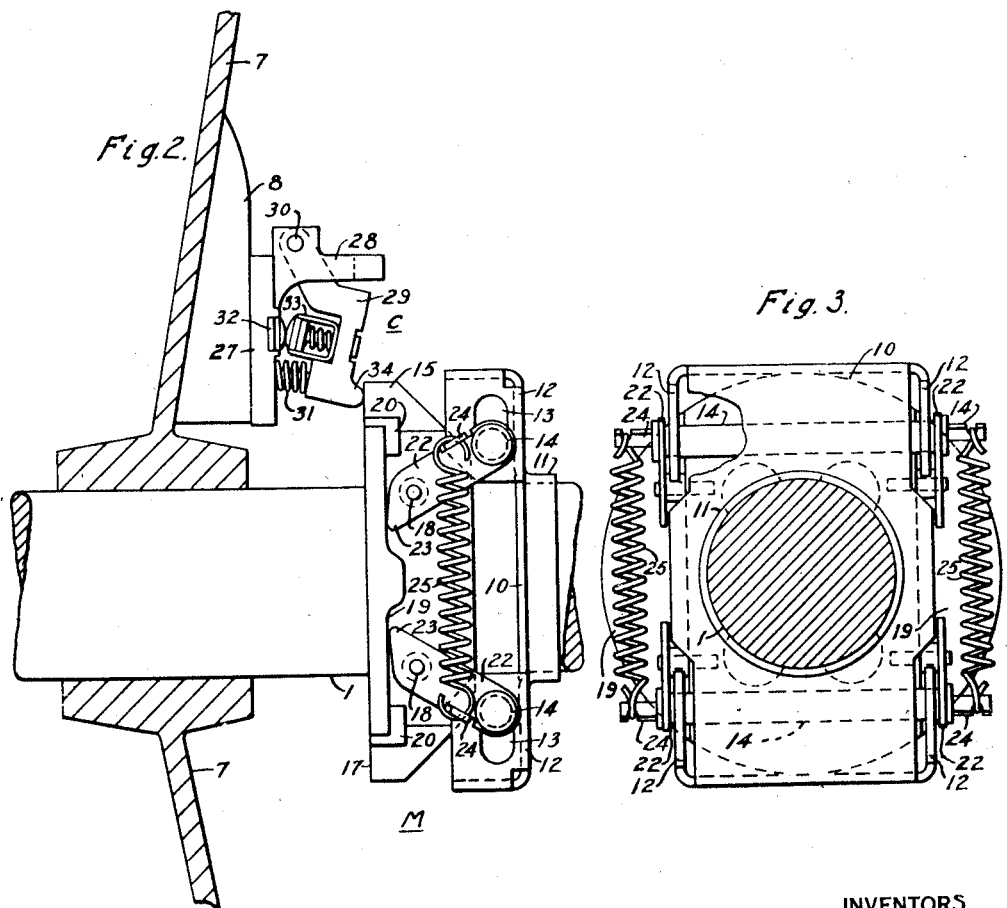
INVENTORS
Francis J. Johns and
Herbert W. Howard.
BY
Paul E. Friedmann
ATTORNEY April 15, 1947.    F. J. JOHNS ET AL    2,419,141
MOTOR CONTROL
Filed Aug. 15, 1944    2 Sheets-Sheet 2

WITNESSES:

INVENTORS
Francis J. Johns and
Herbert W. Howard.
BY
Paul E. Friedemann
ATTORNEY Patented Apr. 15, 1947

2,419,141

UNITED STATES PATENT OFFICE 2,419,141

MOTOR CONTROL

Francis J. Johns, Pittsburgh, and Herbert W. Howard, Wilkinsburg, Pa., assignors to Westinghouse Electric Corporation, East Pittsburgh, Pa., a corporation of Pennsylvania Application August 15, 1944, Serial No. 549,556

1 Claim. (Cl. 200—80)

This invention relates to centrifugal switches for controlling electric circuits in dependence upon the rotary speed of a machine element.

Such switches are used for instance, in electric motors for effecting a change in its circuit connections when a predetermined motor speed is reached during starting periods or when the speed drops below a given value. Thus, single phase motors, having a main or running primary field winding and an auxiliary or starting field winding, are usually provided with a centrifugal switch which changes the circuit connections of these windings from starting to running operation when the motor accelerates close to synchronous speed and which reestablishes the starting connections for resynchronizing the motor if its speed should subsequently drop below normal.

It is known to design switches of the above-mentioned type in such a manner that a disk-like actuating member slidably arranged on a shaft is displaced axially of the shaft when two weighted elements, under centrifugal force, move radially away from the shaft in opposition to a return bias. This axial displacement of the actuating member serves to open a contact device whose contacts are located close to the shaft and substantially within the circumferential area of the actuating disk member. These contacts form also a stop for limiting the spring biased motion of the actuating member.

In these known switches, the contacts are apt to be subjected to relatively high stress and, since they lie within the actuating mechanism, they are inaccessible unless the mechanism is disassembled. An exchange of the contact portion of the switch or an inspection or adjustment of thte contacts is difficult.

It is among the objects of our invention to provide centrifugal switches which are free of the just-mentioned disadvantages and afford an easier inspection, replacement and adjustment of the contacts. Another object is to limit the strain imposed on the contacts by the speed-responsive actuating mechanism.

In order to achieve these objects and in accordance with the present invention, the contact device of a centrifugal switch is mounted laterally of the shaft or machine element that carries the speed responsive actuating mechanism. The contact device has a spring-biased arm extending radially toward the shaft into the path of the axially displaceable actuating member in order to engage this member during accelerating periods.

According to another feature of the invention, the mechanical links that transmit the speed-responsive motion of the centrifugated weight members of the mechanism to the axially displaceable actuating member are so shaped and arranged that they form also a stop for limiting the axial displacement of the actuating member thereby preventing the mechanism as well as the contact device from undue stress.

These objects and features will be apparent from the embodiment of the invention illustrated in the drawing, in which:

Figure 1 is a partial longitudinal and sectional view of an electric motor showing the complete centrifugal switch in assembled condition;

Fig. 2 is a more detailed view for the same assembled switch on a larger scale;

Fig. 3 is an axial view of the actuating mechanism of the switch;

Figure 4:
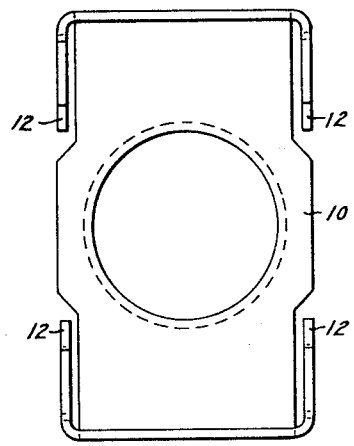
Figs. 4 and 5 show a front view and a side view, respectively, of a support which forms part of the actuating mechanism.

Referring to Fig. 1, numeral 1 denotes the shaft of a single phase induction motor. The motor armature 2 mounted on the shaft has a laminated core which carries a suitable winding here represented by a squirrel-cage winding 3. The stator 4 is likewise laminated and provided with a winding 5. The stator frame 6 is provided ith a cover or bracket 7 which supports a bearing for shaft 1. The bracket 7 has a portion 8 for carrying a contact device denoted as a whole by C. This device forms part of the centrifugal switch according to the invention and cooperates with an actuating mechanism denoted as a whole by M.

Figure 5:
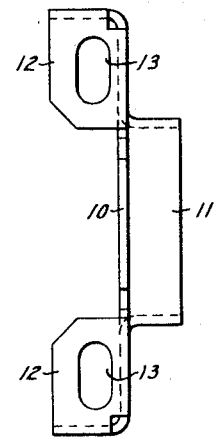
Figure 6:
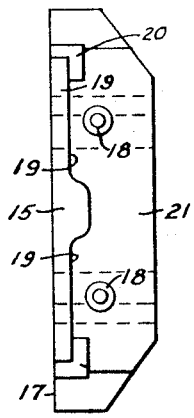
Figs. 6 and 7 are a side view and front view, respectively, of an actuating member also forming part of the mechanism.
Figure 7:
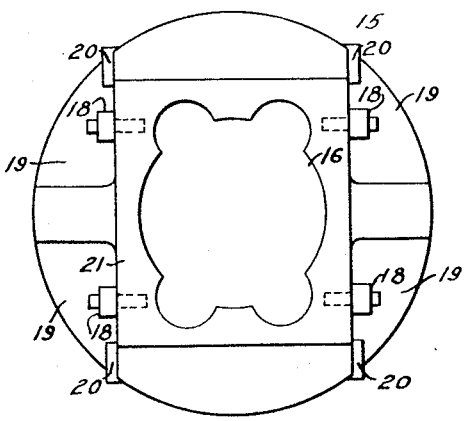

Details of the centrifugal switch comprising the parts C and M are more clearly apparent from Figs. 2 through 7, to which reference is had in the following.

The actuating mechanism M of the centrifugal switch has a supporting member 10 formed of sheet metal which has a sleeve or seat portion 11 of cylindrical shape designed for rigid attachment to the shaft 1. The support 10 is provided with four ears 12 (Figs. 4 and 5) each of which has an elongated slot 13. Each two of these slots form a guide for one of a pair of weight bars 14 (Figs. 2 and 3) which extend in parallel to each other.

The actuating member 15 is preferably molded of insulating material and has a central opening 16 of slightly larger diameter than the shaft 1 so as to be capable of axial motion relative to the shaft. Member 15, at one axial side thereof, has an annular surface 17 which extends in a radial plane of the shaft. At its other side, member 15 has a portion 21 to fit into the space between the ears 12 of the support 10. Four pivot studs 18 are firmly attached to portion 21. The four surface portions 19 of member 15 (Figs. 6 and 7) adjacent to the studs 18 serve as an abutment as will be described in a later place. Four lugs 20 integral with the molded body of member 15 project over the adjacent edges of the ears 12 when the mechanism is in the assembled condition shown in Figs. 2 and 3 and limit the axial displacement of the actuating member 15 by abutting against the ears 12 when the actuating member moves toward the support 10.

Four links 22 (Figs. 2 and 3) have one end attached to the weight bars 14. The other end of each link 22 is pivoted about one of the studs 18, respectively. This pivoted end of each link has an asymmetrical shape so as to form a nose 23 which may abut against the above-mentioned surface portion 19 of the actuating member 15 in order to limit the angular motion of link 22 about its pivot 18. Each link 22 has further an angularly projecting lug 24. Two helical expansion springs 25 are located at radially opposite sides of the shaft and are attached to the two lugs 24 located at either side. These springs tend to move the weight bars 14 toward the shaft and force the actuating member 15 away from the support 10 until a further displacement of member 15 is blocked by the engagement of noses 23 with the surface portions 19 of member 15.

It will be understood from the foregoing that the support and actuating member of the centrifugal switch assume the relative position shown in Figs. 2 and 3 as long as the shaft is at rest or as long as its speed of rotation stays below a magnitude determined by the tension of the springs 25. When the shaft 1 accelerates, the centrifugal force acting on the weight bars tends to move them outwardly along the slots 13. However, such motion occurs only when the speed and centrifugal force exceed the value necessary for overcoming the biasing force of the springs. When this happens, the bars 14 snap immediately toward the outer ends of the slots 13 and thereby shift the actuating member 15 toward the support 10. This snap action is due to the fact that the points of attack of the biasing forces produced by the springs 25 lie closer to the pivot lugs 18 than the points of attack of the centrifugal force acting on the links 22. Consequently, after the centrifugal force has become strong enough to overcome the initial value of spring bias, the rotation of links 22 about their pivots reduces the effective leverage of the spring force so that the effect of the increasing centrifugal force becomes immediately preponderant.

After the actuating member 15 has thus been moved toward the support, a sufficient decrease in shaft speed will cause the spring bias to again overcome the centrifugal force so that the actuating member returns into the illustrated initial axial position relative to the support. This return movement occurs at a slower speed than the above-mentioned snap action because of the small leverage of the spring force relative to the pivot points of links 22.

The contact device C (Fig. 2) controlled by the above-described actuating mechanism comprises an insulating base 27 which is firmly secured on portion 8 of the stationary bracket 7. Base 27 has an angularly extending portion 28 which serves as a pivot and stop for an insulating arm 29. A pin 30 traverses base portion 28 and arm 29 thereby pivoting the arm to the base. A helical compression spring 31 inserted between arm 29 and base 27 tends to move the arm counterclockwise. A stationary contact 32 is firmly secured to base 27 while a corresponding movable contact 33 is resiliently mounted on arm 29. The arm has a nose 34 which projects into the peripheral area of the actuating mechanism for slidable engagement with the annular surface 17 of the actuating member 15. The component forces of spring 31 and of the contact spring appertaining to the movable contact 33 is so rated relative to the axial component of the force exerted by springs 25 on the actuating member 15 that arm 29 and contact 33 are forced into the illustrated closing position when the actuating member 15 is in its position of rest. When the shaft 1 rotates at sufficient speed to cause shifting of the actuating member 15 toward support 10 under the influence of centrifugal force, the arm 29 follows the displacement of member 15 until the further motion of the arm is stopped by portion 28 of base 27. In this position, the contact engagement between contacts 32 and 33 is interrupted.

As shown in Fig. 2, the contact device of the switch is located radially away from the shaft 1 and is separately mounted so that it lies substantially outside the peripheral compass of the actuating mechanism. As a result, the contact elements are readily accessible for inspection, adjustment or exchange and can be installed or removed without affecting the installation of the actuating parts and without necessity of disassembling the actuating parts should an inspection or replacement of the contacts become necessary. Since the contacts and the appertaining parts are not confined to a narrow space within the structure of the actuating mechanism, they can be given a sturdy construction. Due to the fact that the movement of the actuating member 15 toward the contacts is limited by the noses 23 of links 22, an excessive stress on the contact device is also avoided.

The switch is preferably so designed that the contact opening movement of arm 29 is stopped by portion 28 of base 27 shortly before the actuating member 15 abuts against the support 10 when responding to the centrifugal motion of the weight bars. In a switch of such a design, the surface 17 of the actuating member 15 is separated from the slide surface of nose 34 once the shaft has reached full speed so that any friction between the nose and the actuating member is avoided.

It will be obvious to those skilled in the art that the above-described switch can be modified as to details, especially with respect to the shape and location of its individual parts, without departing from the essential features of the invention as set forth in the claim attached hereto.

We claim as our invention:

A centrifugal switch comprising a support adapted to be rigidly secured to a shaft, a disk member movable between positions relative to said support in the axial direction of said shaft and being biased toward one of said positions, weight means slidably mounted on said support for moving said member toward said other positions under the influence of centrifugal force, two pairs of mutually spaced links disposed at opposite radial sides of the shaft and being attached to said weight means and pivoted at said member so as to move angularly relative to said member when the latter moves axially of the shaft, each of said links forming a stop and said member having corresponding stop surfaces for limiting the angular movement of said links relative to said member in order to limit thereby the movement of said member away from said support, and contact means controlled by said member.

FRANCIS J. JOHNS.
HERBERT W. HOWARD.

REFERENCES CITED

The following references are of record in the file of this patent:

UNITED STATES PATENTS

| Number | Name | Date |
| --- | --- | --- |
| 1,552,589 | White | Sept. 8, 1925 |
| 1,897,405 | Thompson | Feb. 14, 1933 |
| 1,935,304 | Weber | Nov. 14, 1933 |
| 2,372,064 | Esarey | Mar. 20, 1945 |